No. 692,277. Patented Feb. 4, 1902.
W. P. HALL.
INCUBATOR.
(Application filed Sept. 30, 1901.)
(No Model.) 2 Sheets—Sheet 1.
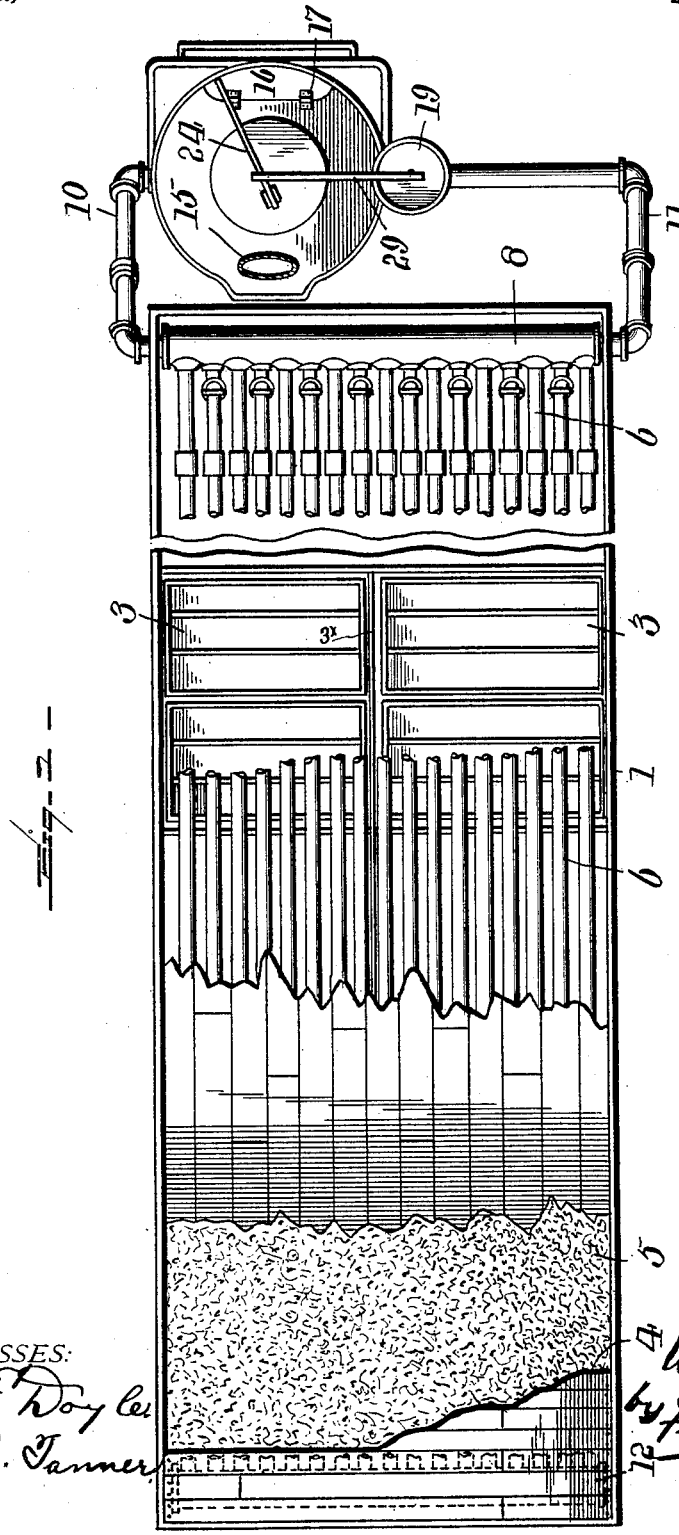

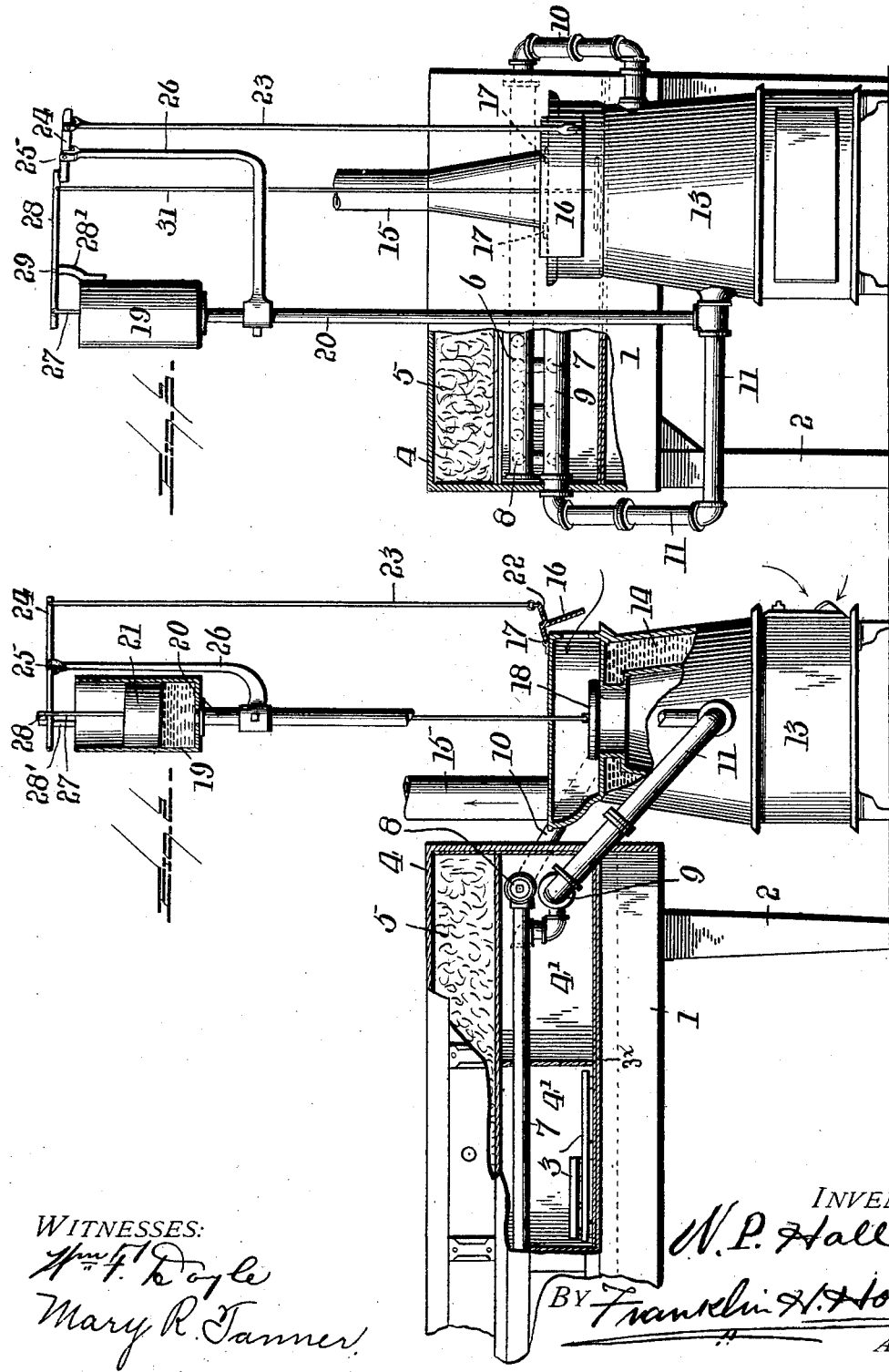

UNITED STATES PATENT OFFICE.

WILBER P. HALL, OF PEMBROKE, NEW YORK.

INCUBATOR.

SPECIFICATION forming part of Letters Patent No. 692,277, dated February 4, 1902.

Application filed September 30, 1901. Serial No. 77,132. (No model.)

*To all whom it may concern:*

Be it known that I, WILBER P. HALL, a citizen of the United States, residing at Pembroke, in the county of Genesee and State of New York, have invented certain new and useful Improvements in Incubators; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in incubators; and it has for its objects, among others, to construct an incubator having a capacity for a large number of eggs—say from one thousand to six or seven thousand, more or less—and to provide for the automatic regulation of the heat, as well as for the requirement of a minimum amount of fuel. The device is automatic in its action, absolutely safe, simple in its construction, ease of operation, and manipulation, and by reason of the separate compartments, hereinafter specifically described, adverse air-currents are prevented and uniform temperature is maintained throughout the entire machine, and these separate compartments permit of placing of fresh eggs in any desired part of the device at any time without chilling or in any way affecting the eggs that may be in all stages of incubation throughout the various compartments of the machine. For instance, any compartment may be opened next to one that is hatching without escape of heat and the very necessary moisture at this stage of incubation. All of the compartments are supplied from one source of heat and heat regulation, yet each compartment is entirely independent of the others in its action. I employ a throttle adapted to be actuated by the expansion of a liquid in a chamber connected with the furnace, and as this throttle is actuated its lever actuates means that control the admission of cold air to the furnace, thus automatically maintaining a practically uniform temperature in all parts of the machine. The heating-pipes are disposed above the compartments and are connected with the furnace, so as to keep up a constant circulation. The device is compact in its nature, is not liable to become inoperative from any cause, the parts are readily assembled, and are not liable to get out of order.

Other objects and advantages of the invention will hereinafter appear, and the novel features thereof will be specifically defined by the appended claim.

The invention in its preferred form is clearly illustrated in the accompanying drawings, which, with the numerals of reference marked thereon, form a part of this specification, and in which—

Figure 1 is a top plan with portions broken away and a portion in section. Fig. 2 is a view, partly in side elevation and partly in vertical section with portions broken away, showing the furnace and regulating device and a portion of the chamber. Fig. 3 is a view at right angles to Fig. 2 with a portion broken away and parts in section.

Like numerals of reference indicate like parts throughout the several views.

Referring now to the details of the drawings, 1 designates the chamber proper, supported in any suitable manner, as upon legs or supports 2, and this chamber may be of shape, material, and capacity desired. It is proposed to divide this chamber into a plurality of compartments, each separate from and independent of the other. The particular arrangement, however, is not essential, and I wish it distinctly understood that I do not intend to restrict myself to the arrangement or disposition of compartments as herein illustrated, either as to number or their relative disposition or size or shape. In the operation of my invention it is my purpose to allow sufficient cool air to enter the air-chamber above the water-jacket and fire-pot after the throttle is closed to cool the water about the fire-pot by the cool air coming in contact with the top wall of said jacket. I find that in practice the cool air coming in contact with the top of the water-jacket when the damper is open is sufficient to cause the water in the jacket to cool and also the water in the expansion-tank, so that the float will settle and actuate the damper and throttle. These compartments, having partition-walls $3^\times$, are designed to receive the egg-trays or egg-holding devices 3, which may be of any desired form of construction, one or more for each compartment. Above these compartments is a compartment 4, designed to receive asbestos or any other suitable material for the purpose of preventing escape of the heat. Suitable doors or other closures may be provided for the various compartments 4' as well as for the compartment 4, and these may be made to turn on hinges, to slide, or in any other way, as may be found most expedient.

6 and 7 are the pipes or heating medium. In this instance I have chosen to show two sets of pipes, one constituting the flow and the other the return pipes. Each alternating pipe is a flow or return pipe, and the return-pipes are connected with the head 8, while the other or flow pipes are connected with the head-pipe 9. The head 8 is connected by pipe 10 with the water-jacket of the furnace, while the other head 9 is connected with the said water-jacket by the pipe 11. This construction is seen best in Fig. 3. The pipes 6 and 7 extend lengthwise of the chamber 1 through separate compartments and beneath the compartment 4, containing the asbestos or other material 5, as seen clearly in Figs. 2 and 3. At the other end of the chamber they are connected to the header 12, as seen best in Fig. 1.

13 is the furnace, which is of any suitable make adapted to the purpose, and is provided with a top or chamber controlled by a damper 16, its water-jacket 14 being connected with the pipes 10 and 11, as above described. 15 is the chimney or stovepipe. Said damper 16 controls the admission of the cold air to the top of the furnace, it being shown partially open in Fig. 2. It is hinged, as at 17, and is adapted to be actuated in a manner soon to be described.

18 is a damper or throttle adapted to control the outlet of the products of combustion from the furnace, as will be readily understood from Fig. 2.

19 is a tank or receptacle supported on the pipe 20, which connects with the pipe 11, as seen best in Fig. 3, and contains heated water, which under high temperature expands. Said tank contains a float 21, supported on the liquid within the tank, and in order to prevent evaporation of the water, as well as to prevent rust, I place upon the water or other liquid in the tank a quantity of thin machine-oil or the like. The movement of this float controls the position of the throttle 18 and the damper 16. In the present instance I have shown one form of mechanism for this purpose; but it is evident that other forms of mechanism may be provided and yet accomplish the same purpose. As herein illustrated, the door or damper 16 is provided with a lug or extension 22, to which is connected one end of the cord or wire or other connection 23, the other end of which is connected to the outer end of the lever 24, fulcrumed at 25 in the bifurcation of the arm 26, which is adjustably sleeved on the rod or pipe 20, being held in its adjusted position in any suitable manner. This lever, upon the opposite side of its pivot, is actuated by a lever 28, which is connected to the stem 27 of the float, as seen clearly in Fig. 3.

28' is another arm secured to the tank 19, to the upper end of which arm is pivoted, as at 29, the lever 28, to the outer end of which is pivoted the upper end of a rod or other connection 31, the lower end of which is connected to a throttle or damper 18, above referred to, while the other end of the lever is connected to the stem 27, carried by the float. The outer end of the lever 28 is disposed so as to act upon the upper face of the adjacent end of the lever 24, as seen in the different views, so that as the outer end of the lever 28 is depressed and the throttle 18 closed the adjacent end of the lever 24 will be lowered, and thus raising its outer end opens the draft-door 16, as will be readily understood.

With the parts constructed and arranged substantially as above described the operation will be substantially as follows: The eggs being placed in the trays and the trays inserted in the various compartments and the doors thereof closed, the compartments are heated to the required temperature, and this temperature will be automatically maintained. The expansion of the liquid in the tank 19 will cause the float 21 to rise, and this, by reason of the connections just described, will close the throttle and open the damper 16, all draft through the furnace at the top being thus shut off, and at the same time the cold-air draft is opened and cold air admitted over the top of the fire-pot, as seen in Fig. 2, and the liquid in the tank being cooled the float will fall and the throttle will open and the draft-damper will be closed. The heat is maintained at practically the same temperature throughout the various compartments, and the opening of any one of such compartments does not interfere in the least with any of the others.

From the above it will be seen that I have devised a simple, cheap, yet practical and efficient incubator, and while the structural embodiment of my invention as herein disclosed is what I at the present time consider the preferable it is evident that changes, variations, and modifications may be resorted to without departing from the spirit of the invention or sacrificing any of its advantages, and I therefore do not wish to restrict myself to the details of construction herein illustrated and described, but reserve the right to make such changes, variations, and modifications as come properly within the scope of the protection prayed.

The device may be ventilated in any suitable manner, either from top or bottom, as preferred.

What I claim as new is—

In combination with an incubator, a heater, having a water-jacket, pipes within the incubator having communication with said water-jacket, the upper end of the heater having an air-chamber, a throttle mounted over an aperture leading into said chamber, a stem to said throttle passing through an aperture in the upper wall of said chamber, an expansion-cylinder, a float mounted therein, said expansion-cylinder having communication with the water-jacket, an adjustable bracket-arm on the support for the expansion-cylinder, a lever pivoted to the end of said bracket-arm, a damper pivoted to the top of the chamber of the heater, a rod connecting said damper, with the pivoted lever, a second lever fulcrumed on a bracket or arm of said expansion-cylinder, and having connection with the float at one end, and the stem of said throttle at a location adjacent to its other end, which rests upon the pivoted lever carried by the bracket-arm, substantially as shown and described.

In testimony whereof I hereunto affix my signature in presence of two witnesses.

WILBER P. HALL.

Witnesses:
CADDIE C. HALL,
BERT C. TURNER.